United States Patent
Dumbeck et al.

(10) Patent No.: US 8,605,103 B2
(45) Date of Patent: *Dec. 10, 2013

(54) IMAGE QUALITY CONFIGURATION APPARATUS, SYSTEM AND METHOD

(71) Applicants: ATI Technologies ULC, Markham (CA); Advanced Micro Devices, Inc., Sunnyvale, CA (US)

(72) Inventors: Raymond F. Dumbeck, Austin, TX (US); Andrew W. Dodd, Toronto (CA); Michael C. Gotcher, Lakeway, TX (US)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,723

(22) Filed: Dec. 27, 2012

(65) Prior Publication Data

US 2013/0113818 A1 May 9, 2013

Related U.S. Application Data

(63) Continuation of application No. 12/644,300, filed on Dec. 22, 2009, now Pat. No. 8,350,867.

(51) Int. Cl.
| | |
|---|---|
| *G09G 5/00* | (2006.01) |
| *G09G 5/02* | (2006.01) |
| *G09G 5/39* | (2006.01) |
| *G09G 5/36* | (2006.01) |
| *G06K 9/40* | (2006.01) |
| *G06K 9/54* | (2006.01) |
| *G06F 17/30* | (2006.01) |
| *G06F 3/00* | (2006.01) |
| *G06F 3/048* | (2013.01) |

(52) U.S. Cl.
USPC ......... 345/581; 345/428; 345/530; 345/548; 345/611; 345/619; 358/448; 382/254; 382/260; 382/269; 382/274; 382/305; 707/705; 715/700; 715/764; 715/781; 715/803

(58) Field of Classification Search
CPC .............. G09G 5/00; G09G 5/02; G09G 5/36
USPC ......... 345/581, 589, 428, 530, 548, 611, 619; 358/448; 382/254, 260, 269, 274, 305; 707/705; 715/700, 764, 781, 803
See application file for complete search history.

(56) References Cited

U.S. PATENT DOCUMENTS

| | | | |
|---|---|---|---|
| 7,498,839 B1 | 3/2009 | Jenkins, IV | |
| 7,551,190 B2 * | 6/2009 | Shiomi et al. | 345/698 |

(Continued)

*Primary Examiner* — Wesner Sajous
(74) *Attorney, Agent, or Firm* — Faegre Baker Daniels LLP

(57) ABSTRACT

A method includes detecting one of an application access or a file type access, and configuring, in response to detecting the application or file type access, automatically without user interaction, a display system in an image quality configuration for the application or the file type where the image quality configuration is based on providing best image quality with respect to the application or the file type. Configuring the display system in an image quality configuration, may involve determining that a profile associated with the application or associated with the file type is stored in memory, and configuring the display system according to the profile. The method may adjust at least one anti-aliasing parameter or at least one anisotropic filter parameter. The method may monitor an operating system to obtain an indication that an application has been accessed or that a file type has been accessed.

12 Claims, 6 Drawing Sheets

(56) References Cited

U.S. PATENT DOCUMENTS

| | | | |
|---|---|---|---|
| 7,590,947 B1* | 9/2009 | Gay et al. | 715/800 |
| 7,913,164 B1 | 3/2011 | Svendsen | |
| 8,144,174 B2* | 3/2012 | Shiomi et al. | 345/698 |
| 8,350,867 B2* | 1/2013 | Dumbeck et al. | 345/589 |
| 2004/0179744 A1* | 9/2004 | Chang et al. | 382/240 |
| 2005/0007397 A1* | 1/2005 | Hatori et al. | 345/698 |
| 2005/0017978 A1* | 1/2005 | Hatori et al. | 345/501 |
| 2007/0064954 A1 | 3/2007 | Booth et al. | |
| 2007/0100834 A1 | 5/2007 | Landry et al. | |
| 2007/0204346 A1 | 8/2007 | Meier | |
| 2007/0207846 A1 | 9/2007 | Burak et al. | |
| 2008/0021640 A1 | 1/2008 | Pyo | |
| 2009/0172736 A1 | 7/2009 | Tsui et al. | |
| 2011/0078415 A1* | 3/2011 | Johnson et al. | 712/208 |
| 2011/0148899 A1 | 6/2011 | Dumbeck et al. | |

* cited by examiner

IMAGE QUALITY CONFIGURATION APPARATUS, SYSTEM AND METHOD

CROSS-REFERENCE TO RELATED APPLICATIONS

This application is a continuation application of U.S. patent application Ser. No. 12/644,300 filed on Dec. 22, 2009, entitled IMAGE QUALITY CONFIGURATION APPARATUS, SYSTEM AND METHOD, owned by instant assignee and incorporated herein by reference and is related to U.S. patent application Ser. No. 12/198,372, filed Aug. 26, 2008, entitled PROFILE ADJUSTMENT MODULE FOR USE WITH DATA PROCESSING SYSTEM, which is incorporated by reference herein.

FIELD OF THE DISCLOSURE

The present disclosure is related to systems and methods for automatically adjusting image quality based on application type.

BACKGROUND

Image processing, including processing of 3-dimensional (3D) images, has been progressively advancing. Various applications, such as, but not limited to, games with 3D images, DVD viewing applications, photo viewing and editing applications, TV viewers such as HDTV viewers, etc., all produce visual aspects that, in view of the display screen type and size, capabilities of the processors within the viewing device, etc., often would benefit from different and, in some cases, unique, settings that would result in the best possible image quality suitable for the particular application.

However, even if such settings are accessible to a user, such settings may not be well understood and the user may not be fully versed in how to best adjust the settings to obtain optimum image quality for a specific application. On the other hand, a sophisticated user who understands what adjustments should be made, must manually make the adjustments, using appropriate user interfaces, at the particular time the desired application is being run and displayed. The settings may then need to be changed again, for the next application the user intends to run on the device, which is a tedious process.

Some existing systems have the ability to detect that a given application is being run, such as a gaming application, and adjust various device settings such that performance aspects of the electronic device are optimized, such as clocking, frames per second, etc., however these systems do not account for image quality.

Further, with respect to image quality, other adjustments that may be feasible for the technology in use, (i.e. given the processors such as a GPU and related graphics pipeline logic being used), may not be accessible by the user. That is, the ability to adjust, via an interface, various logical components that act to render images on the display using the specific processing hardware of the device, and for a specific application, are not available at the user level of application software or even at the operating system level.

DETAILED DESCRIPTION

Figure 1:
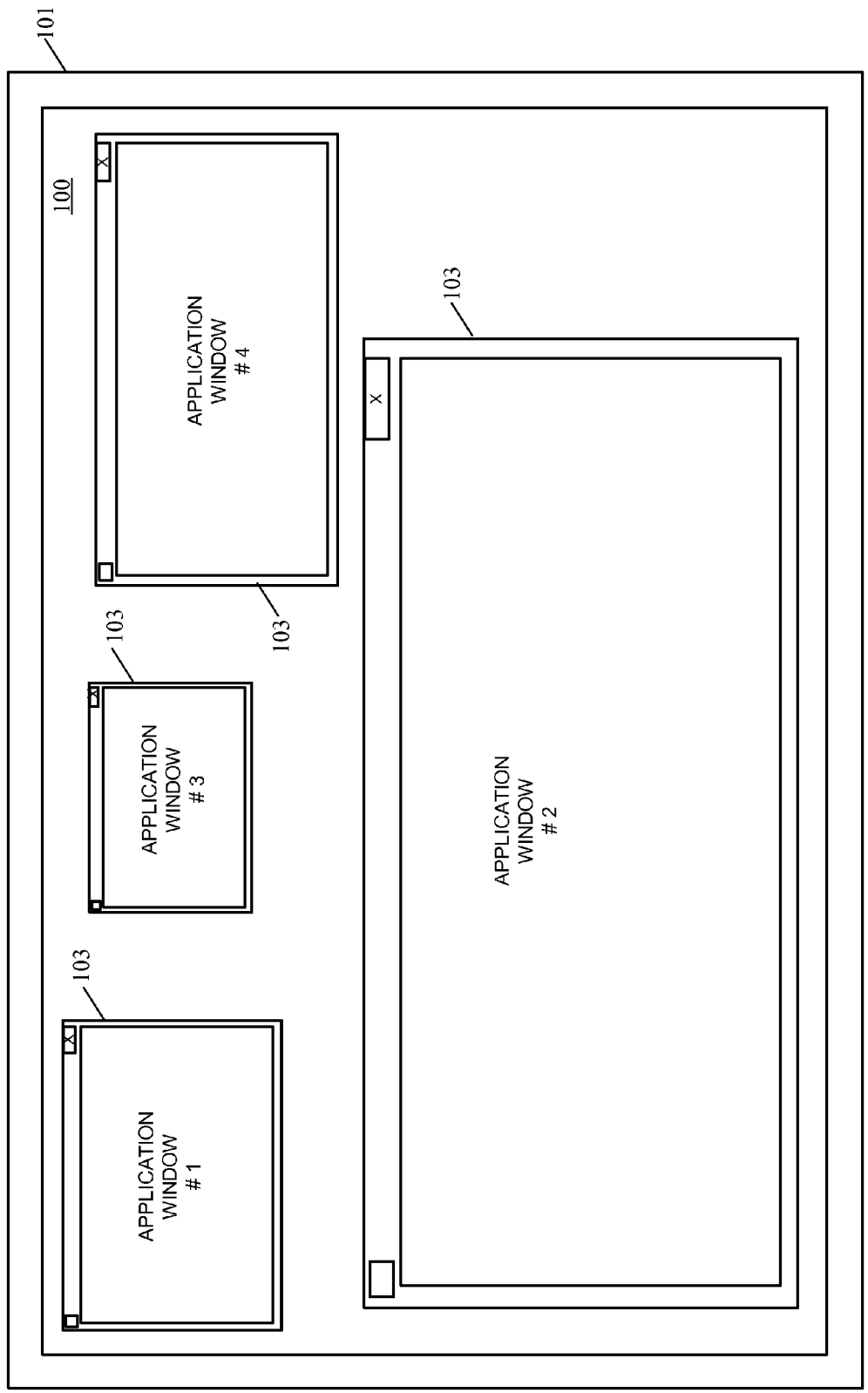
FIG. 1 is a diagram of a display, which may be a standalone display, a computer monitor, a display of a handheld device, etc., with a plurality of application windows displayed within the screen space of the display.

The present disclosure provides an apparatus and method where the method includes detecting one of an application access or a file type access, and configuring, in response to detecting the application access or the file type access, automatically without user interaction, a display system in an image quality configuration for the application or the file type wherein the image quality configuration is based on providing best image quality with respect to the application or the file type. Configuring the display system in an image quality configuration, in one embodiment, may include determining that a profile associated with the application or associated with the file type is stored in memory, and configuring the display system according to the profile. Configuring the display system in an image quality configuration, in some embodiments, may also include adjusting at least one anti-aliasing parameter or at least one anisotropic filter parameter.

The method, in some embodiments, may detect application access or file type access by monitoring an operating system of the display system and obtaining an indication from the operating system that an application has been accessed or that a file type has been accessed. In other embodiments, the method may detect application access, or file type access, by monitoring a GPU of the display system and obtaining a process invocation indication from the GPU where the process invocation corresponds to a specific application access.

The method may also include displaying, on a display screen space, of the display system, a plurality of application windows where application access corresponds to selection of one of the application windows. The method then determines that the one application window is larger than a minimum percentage of the display screen space, and configures the display system in the image quality configuration for the application where the application provides a display only within the one application window. In an alternative embodiment, the method may include determining that processor utilization of at least one processor, related to the application corresponding to the one application window, is larger than a minimum percentage processor utilization, and may thus configure the display system based on the application causing a high processor utilization.

The method of may include configuring the display system in the image quality configuration by adjusting at least one setting selected from the settings of: sharpness, color correction, brightness, contrast, color vibrance and flesh tone correction.

The embodiments also include an apparatus, such as an electronic device that includes image quality configuration logic. The image quality configuration logic is operative to detect one of an application access or a file type access, and configure, in response to detecting the application access or the file type access, automatically without user interaction, a display system in an image quality configuration for the application or the file type where the image quality configuration is based on providing best image quality with respect to the application or the file type. The logic may also be operative to determine that a profile associated with the application or associated with the file type is stored in memory, and configure the display system according to the profile.

In some embodiments, the logic is operative to adjust at least one anti-aliasing parameter or at least one anisotropic filter parameter. The apparatus may also, in some embodiments, have logic operative to monitor an operating system of the apparatus and obtain an indication from the operating system that an application has been accessed or that a file type has been accessed. In an alternative embodiment, the logic may be operative to monitor a GPU of the apparatus and obtain a process invocation indication from the GPU that corresponds to a specific application access.

The apparatus may also be operative to display, on a display screen space, a plurality of application windows wherein the application access is a selection of one application window of the plurality of application windows, determine that the one application window is larger than a minimum percentage of the display screen space, and configure the apparatus in the image quality configuration for the application wherein the application provides a display only within the one application window. Alternatively, the apparatus may determine processor utilization of at least one processor, related to an application corresponding to the one application window.

The apparatus may include logic that is operative to adjust at least one setting selected from the settings of: sharpness, color correction, brightness, contrast, color vibrance and flesh tone correction.

The present disclosure further provides a computer readable memory, that includes executable instructions for execution by at least one processor, that when executed cause the at least one processor to perform the operations and methods in accordance with the embodiments as outlined above. The computer readable memory may be any suitable non-volatile memory such as, but not limited to programmable chips such as EEPROMS, flash ROM (thumb drives), compact discs (CDs) digital video disks (DVDs), etc., that may be used to load executable instructions or program code to other processing devices or electronic devices such as those described in further detail herein below.

The terminology "display system" as used herein refers to one or more electronic devices and one or more display devices, operatively coupled to provide display of information and images related to applications and/or electronic files of various file types. The one or more display devices may be integrated with the electronic device or may be external from the electronic device, or combinations thereof.

The terminology "electronic device" as used herein refers to an apparatus that may includes one or more programmable processors, and other hardware, software and/or firmware, such that the electronic device may run various applications in response to user selection. The electronic device may include an integrated "display device" and/or may be connectable to one or more external display devices.

The terminology "display device," or "display," as used herein refers to an electronic display device such as a monitor, a CRT, LCD flat panel, LED flat panel, plasma screen, etc., that may be integrated with an electronic device, or may be external and connectable to an electronic device. The display device may include memory and/or logic that enables the adjustment, or configuration, of image quality settings related to images displayed on the screen space of the display device.

The term "logic" as used herein may include software and/or firmware executing on one or more programmable processors, ASICs, DSPs, hardwired logic or combinations thereof, and may be present within an electronic device and/or within a display device.

The terminology "image quality," "image quality settings," and "image quality configuration," refers to image fidelity settings, that is, settings that impact the visual appearance of an electronic file (such as a still image picture or document or a video such as an MPEG file) and that are, at least, not directly related to performance including processor performance or the performance of a graphics processing pipeline. "Dynamic image enhancement settings" as used herein are image quality settings that may be adjusted dynamically, that is, automatically configured and without user intervention, as the user works with, and selects/deselects, various applications. The dynamic image enhancement settings may be settings of an electronic device and/or settings of one or more display devices. An "image quality configuration" as used herein refers to image quality settings of an electronic device and/or at least one display device. The image quality settings are "configured," that is, set or adjusted, in accordance with the embodiments, to provide the best possible image quality related to a given application or file type that is being displayed on a screen space. The configuration may be determined by a profile stored in memory. The configuration is performed dynamically, that is, automatically and without user interaction or intervention.

The terminology "screen space" as used herein refers to a display area (for example, a screen area that may be defined in terms of pixels) and may refer to the screen space area of a single "display device" but may also refer to a screen space area formed by a conglomeration of display devices when such display devices are used together to form a single large area display. In this case the conglomeration of display devices may form a "screen space" upon which, for example, an application, file type, or various application windows, may be displayed.

The terminology "file type" refers to an electronic file that is usually defined in terms of a standard such as, but not limited to, JPG/JPEG, GIF, MPEG, etc., but may also refer to an electronic file that is determined by its file "extension" such as, but not limited to, ".doc," ".pdf," etc.

The term "focus" and also "window focus" refers to an operation whereupon a computing device or electronic device user selects, usually by moving a mouse cursor over an area on a screen space and clicking, that is, "selecting," an application window in order to view that information displayed within the application window, or to proceed with some other operation related to the application or the application window (such as, but not limited to, resizing or moving the application window).

Figure 2:
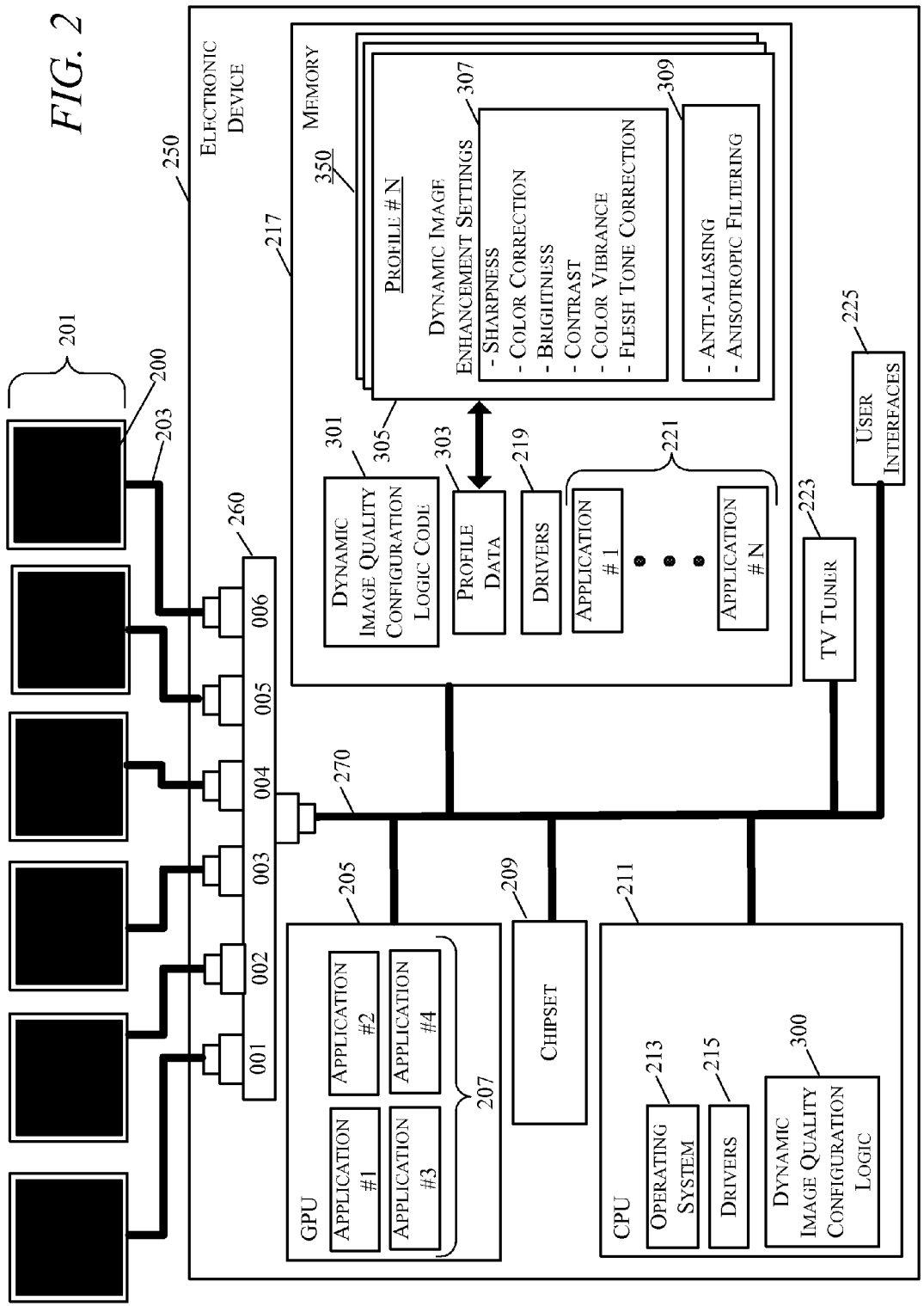
FIG. 2 is a block diagram of an electronic device of the various embodiments, which is operatively coupled to one or more displays. A display may also be integrated with the electronic device or may be separate and connected via cabling, wireless connections, etc.

Turning now to the drawings wherein like numerals represent like components, FIG. 1 illustrates a display, or monitor, 101 which includes a screen space 100. The screen space 100 may display a plurality of application windows 103, such as application windows 1 through 4. FIG. 2 illustrates an electronic device 250 in accordance with the various embodiments. The electronic device 250 in conjunction with at least one display device 201 forms a display system. FIG. 2, as well as other FIGs. presented and described herein, are to be understood as illustrating to those of ordinary skill, the logical components necessary for making and using the various embodiments disclosed herein, and are not intended to be complete schematic diagrams of all components necessary for implementing an electronic device, etc. Therefore, various other internal components may be present and various arrangements of such internal components and corresponding connectivity may be utilized and such arrangements and corresponding connectivity would remain in accordance with the embodiments herein disclosed. Thus the various internal components are operatively coupled via a communication bus, however other intervening components may or may not be present in some, or all, communication pathways. All such arrangements remain in accordance with the embodiments. Therefore, electronic device 250 is operatively coupled to one or more displays 201. Each one of the displays 201 includes a screen space 200, and is operatively coupled to the electronic device 250 via cabling 203 which connects the display to a logical connector port of a connector interface 260. However, in some embodiments the displays 201 may be connected to the electronic device 250 by other means such as wireless connections, etc. The connector interface 260 is operatively coupled to various elements within the electronic device 250 via internal communication bus 270. The communication bus 270 provides operative coupling between various elements of the electronic device 250 such as, but not limited to, GPU 205, chip set 209, CPU 211, memory, such as system memory, 217, TV tuner 223 and various user interfaces 225.

The CPU 211 performs various operations such as running an operating system 213 and also running various loaded drivers 215. In accordance with the embodiments, the CPU 211 may also include Dynamic image quality configuration logic 300 as will be described in further detail herein. The GPU 205 may run a plurality of applications 207, which may correspond to the various application windows 103 displayed on the screen space 100 as was illustrated in FIG. 1. However, in accordance with the embodiments herein described, the screen space may be a conglomeration of individual display screen spaces such as the screen spaces 200 of the displays 201. Therefore, as will be further described, the various embodiments may adjust the settings related to a single display or monitor, or may adjust the settings of a plurality of displays, where the plurality of displays act in conglomeration to provide a single screen space.

In accordance with the various embodiments, a dynamic image quality configuration logic 300 detects the running of an application, such as one selected from the plurality of applications 207, or may detect access of a specific file type such as, but not limited to, JPEG, GIF or other image file, for example. In the exemplary embodiment illustrated in FIG. 2, the CPU 211 includes the dynamic image quality configuration logic 300, which may be implemented by the CPU 211 running a dynamic quality configuration logic code 301 stored in memory 217. However, the dynamic image quality configuration logic 300 may be implemented in various ways and may, for example, be distributed between, the GPU 205 and the CPU 211 in some embodiments.

Also in accordance with the various embodiments, the memory 217 includes profile data 303 which consists of a plurality of profiles 350. An exemplary profile 305 illustrates that each profile will contain dynamic image enhancement settings such as the settings 307 and settings 309. Settings 309 are particular to applications utilizing 3D imagery as will be discussed further herein.

Figure 3:
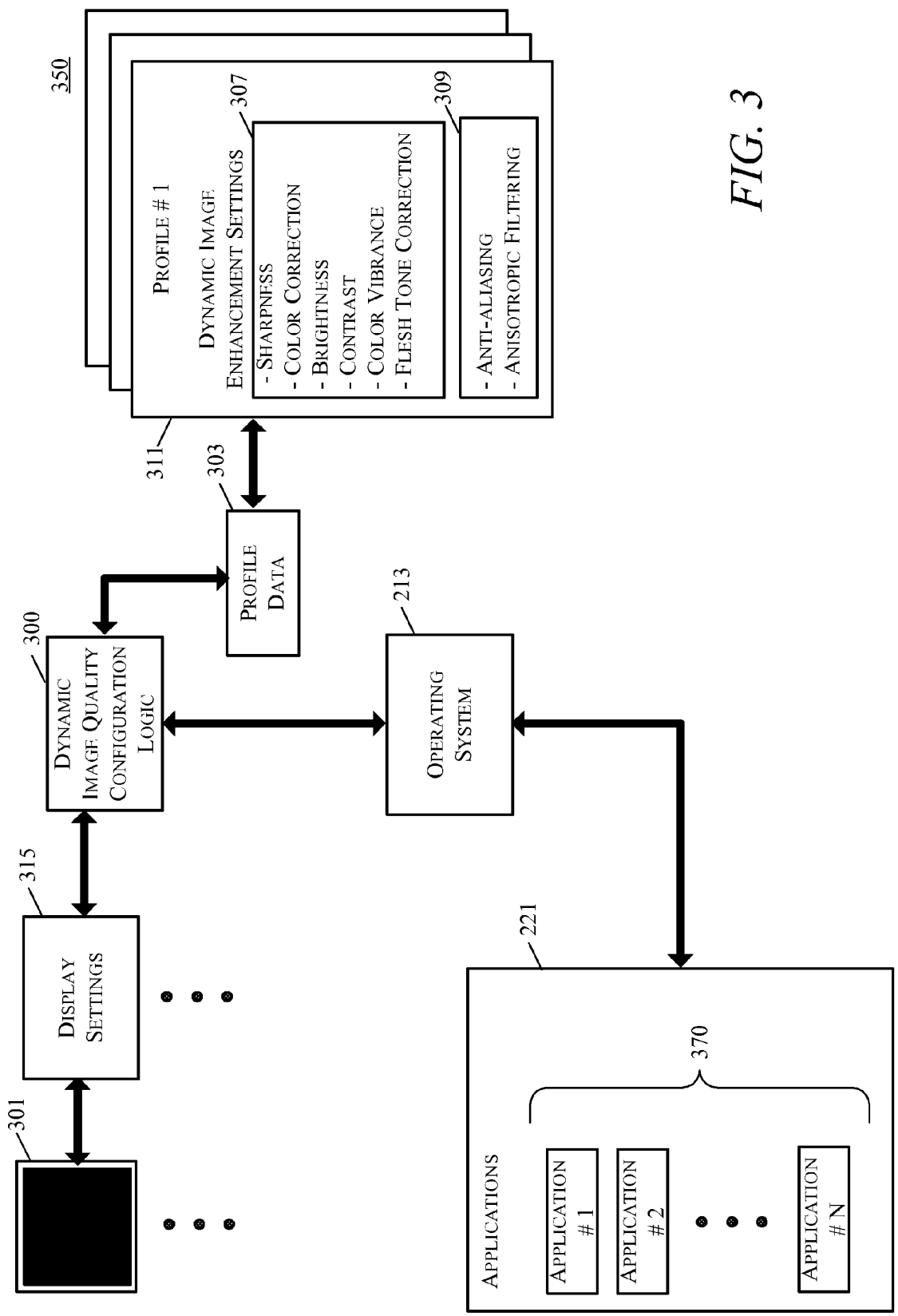
FIG. 3 is a logical block diagram of dynamic image quality configuration logic in accordance with the embodiments, and shows the various interactions of the logic with other logical components.

FIG. 3 is a logical block diagram that is helpful for understanding the operation of the various embodiments. In FIG. 3, the dynamic image quality configuration logic 300 is shown in relation to the various logical objects within the electronic device 250. It is to be understood that, because FIG. 3 is a logical diagram, it is agnostic as to how the various elements, such as the dynamic image quality configuration logic 300, are implemented in any specific embodiment. For example, as discussed above, the dynamic image quality configuration logic 300 may consist of dynamic image quality configuration logic code 301, which may be distributed between the CPU 211 and GPU 205, or may include hardwired logic, or may be a combination of hardwired logic and code executing on a programmable processor such as the CPU 211 and/or GPU 205.

FIG. 3 shows that the dynamic image quality configuration logic 300 interfaces with profile data 303 to access the plurality of profiles 350 stored within the memory 217. The dynamic image quality configuration logic 300 also interacts with the operating system 213 in various ways. For example, the operating system 213 may be utilized by a user to launch and operate various applications 221. That is, a user may select and run one or more applications from a plurality of available applications. The plurality of applications 370 shown in FIG. 3 are understood to be applications currently running and displayed on at least one display such as display 301, or on a plurality of displays. In one example of operation, a user may launch an application and display a corresponding application window on the display 301. The dynamic image quality configuration logic 300 will detect the specific application launched and will take appropriate action to change or otherwise adjust dynamic image enhancement settings related to the launched application. For example, the dynamic image quality configuration logic 300 may detect that application #1 has been launched and is being displayed on the display 301. The dynamic image quality configuration logic 300 will, in response, access the profile data 303 and get a profile from the plurality of profiles 350 related to application one. For example, profile #1, 311, may be the profile specific to application #1 and will include a set of dynamic image enhancement settings 307 and/or 309. The dynamic image quality configuration logic 300 will then interface with the display 301, display settings 315, and apply the parameters of the profile 311 to adjust the display settings 315 without any interaction by the user. For example, the dynamic image quality configuration logic 300 may adjust display settings 315 to adjust the sharpness, color correction, brightness, contrast, color vibrancy and apply flesh-tone correction. In the event that application #1 utilizes 3D images, the dynamic image quality configuration logic 300 may also apply the 3D settings 309 and adjust anti-aliasing and anisotropic filtering parameters. The anti-aliasing and anisotropic filtering parameters may be internal to the electronic device, that is, they may not be part of the display settings 315 but may impact operation of, for example, graphics processing operations related to the application that are run on the GPU 205.

Figure 4:
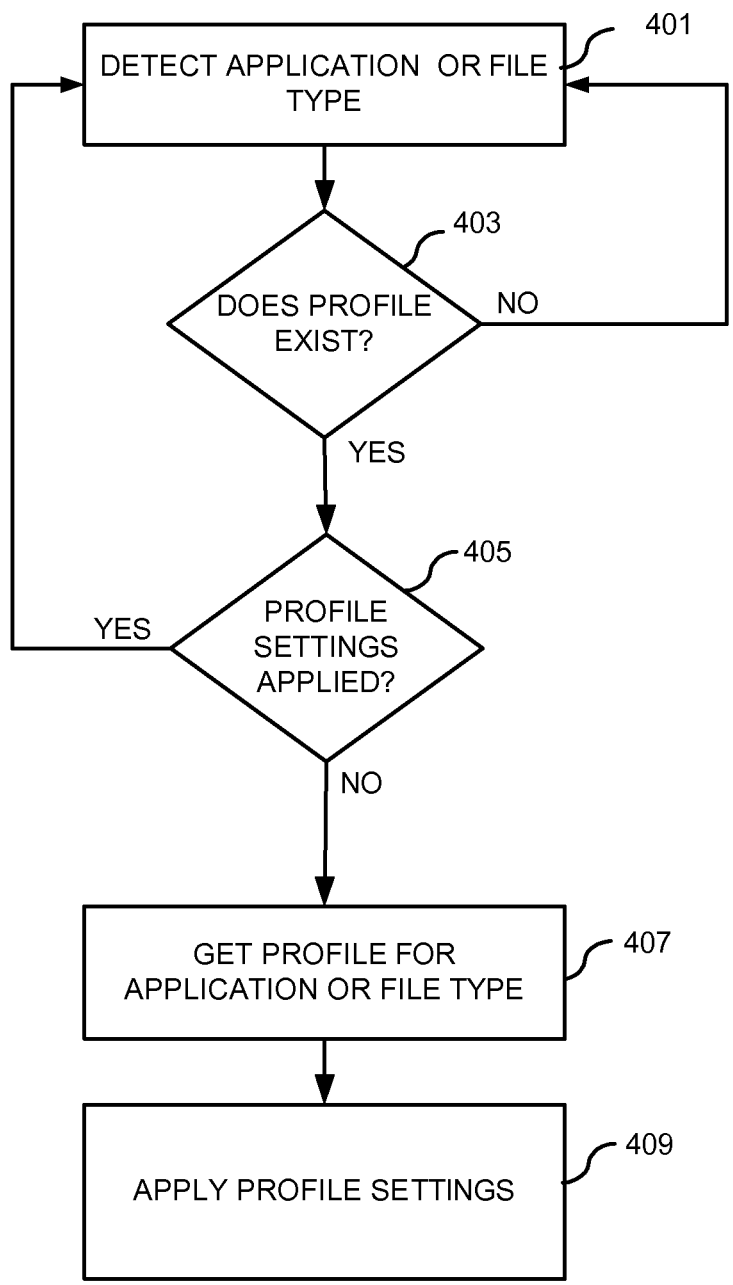
FIG. 4 is a flow chart showing high level operation of dynamic image quality configuration logic in accordance with the embodiments.

The flowchart of FIG. 4 illustrates basic operation of the embodiments. In 401, the dynamic image quality configuration logic 300 detects an application or a file type, and determines if a profile exists for that application or file type as shown in 403. If not, then the dynamic image quality configuration logic 300 continues to monitor for additional accesses applications or file types. If a profiles does exist as determined in 403, the profile settings are compared in 405. If the settings of the profile are applied, then the process returns to 401 and the dynamic image quality configuration logic 300 continues to monitor for additional accesses of applications or file types. Otherwise, if the profiles settings are not applied as determined in 405, the profile is obtained from the profile data in 407 and is applied as shown in 409. For example, the dynamic image quality configuration logic 300 gets the profile in 405 for the application or file type and applies the profile settings in 407 to adjust the display settings of one or more displays.

Figure 5:
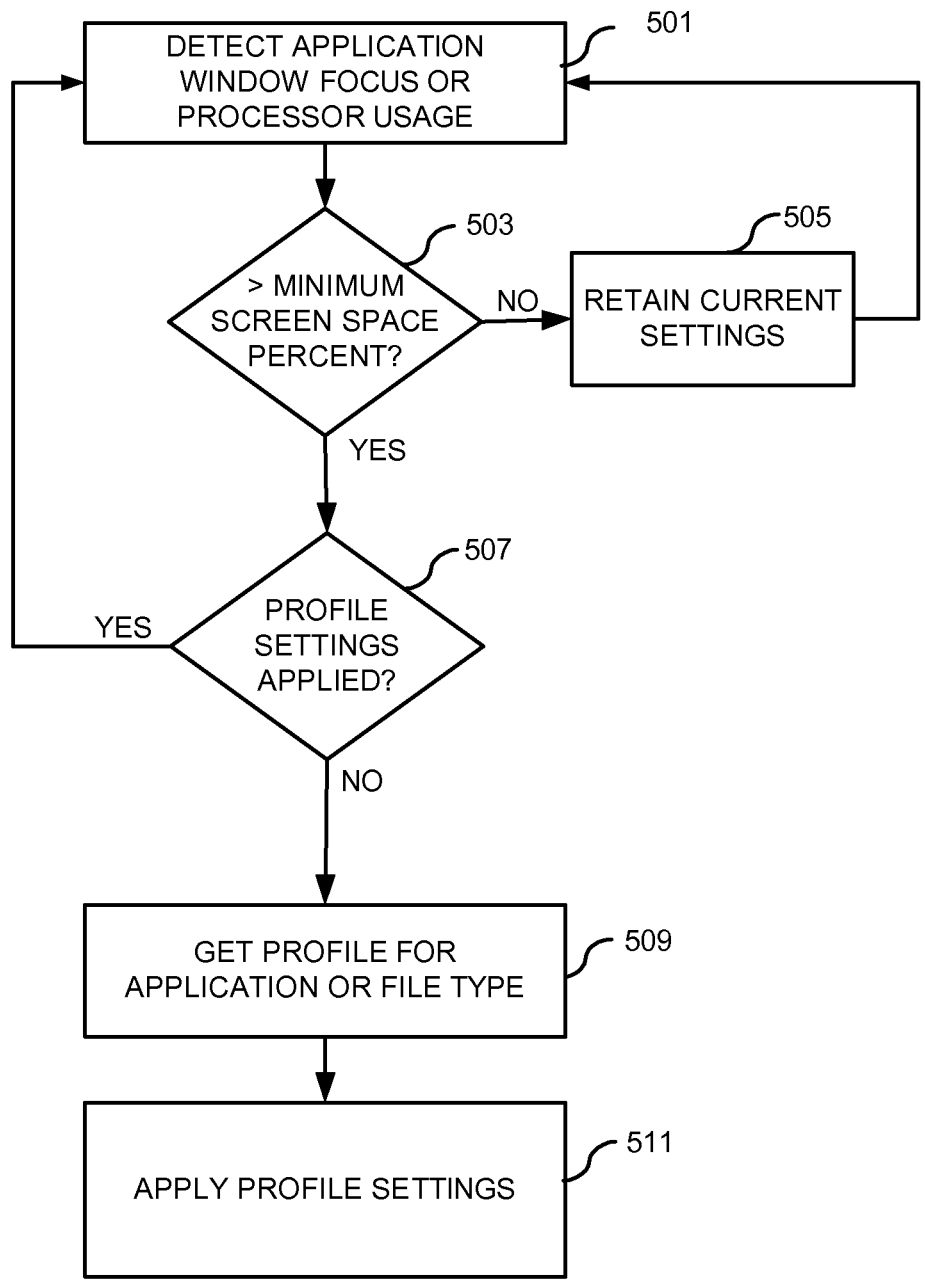
FIG. 5 is a flow chart showing operations for handling window focus of various applications displayed in a screen space in accordance with an embodiment.

FIG. 5 illustrates operation of the embodiments for a scenario similar to that illustrated in FIG. 1 where more than one application may be displayed in application windows on a screen space of a display. In such scenarios the dynamic image quality configuration logic 300 may prioritize which application gets priority in terms of the overall display settings. For example, in some embodiments, the dynamic image quality configuration logic 300 may detect application window focus or processor usage related to a specific application as shown in 501. Thus, if for example a minimum screen space percent is exceeded by the application window of an application that is in focus as determined in 503 the settings may be adjusted. Otherwise, if the screen space minimum is not exceeded as determined in 503, then the current settings are retained as shown in 505, the process returns to 501 and the dynamic image quality configuration logic 300 continues to monitor for application window focus of applications that are being run and displayed.

For instances where it is determined in 503 that the current window in focus is greater than the minimum percentage of screen space, the profile related to the application is compared to the current settings to determine if they have already been applied as shown in 507. If the setting are already applied, then the process returns to 501 and the dynamic image quality configuration logic 300 continues to monitor for application window focus of applications that are being run and displayed. Otherwise, if the profiles settings are not applied as determined in 507, the profile is obtained from the profile data in 509 and is applied as shown in 511. For example, the dynamic image quality configuration logic 300 gets the profile for the application in focus and applies the profile settings to adjust the display settings of one or more displays. It is to be understood that the application window, for which the image quality settings have been applied, may be taken out of "focus" and another application window may be placed in focus. However, the system described above will maintain the settings for the application window meeting the criteria of size, that is, if an application window is larger than the minimum percentage of screen space, the image quality settings will be maintained pertaining to that application window. The minimum percentage of screen space is a predetermined criteria that may be determined as an arbitrary value by those of ordinary skill. For example, a user may view a movie in an application window that is sized larger than the minimum screen space (for example, greater than 20%, 50%, etc.) and may run another application, such as a word processing application, in second application window. In this case the system of the embodiments will maintain the image quality setting related to the movie application window.

It is also to be understood that the system of the embodiments may toggle between image quality settings based on user activity. For example, if the user is running a movie and a word processing application as described above, and closes the movie application window to work solely with the word processing application window, the system of the embodiments will adjust the settings in accordance with a profile for the word processing application, if one exists, or may other revert to default image quality settings.

It is also to be understood that other criteria may be used in the embodiments to determine when to adjust image quality settings. For example, rather than monitoring application window size as a percentage of screen space, the system of the embodiments may monitor CPU (or GPU) utilization. In this scenario, image quality adjustments may be applied when a given application exceeds a predetermined processor (CPU, GPU or a combination usage) percent utilization. Other criteria may be contemplated by those of ordinary skill and such criteria would remain within the scope of the embodiments herein disclosed.

Figure 6:
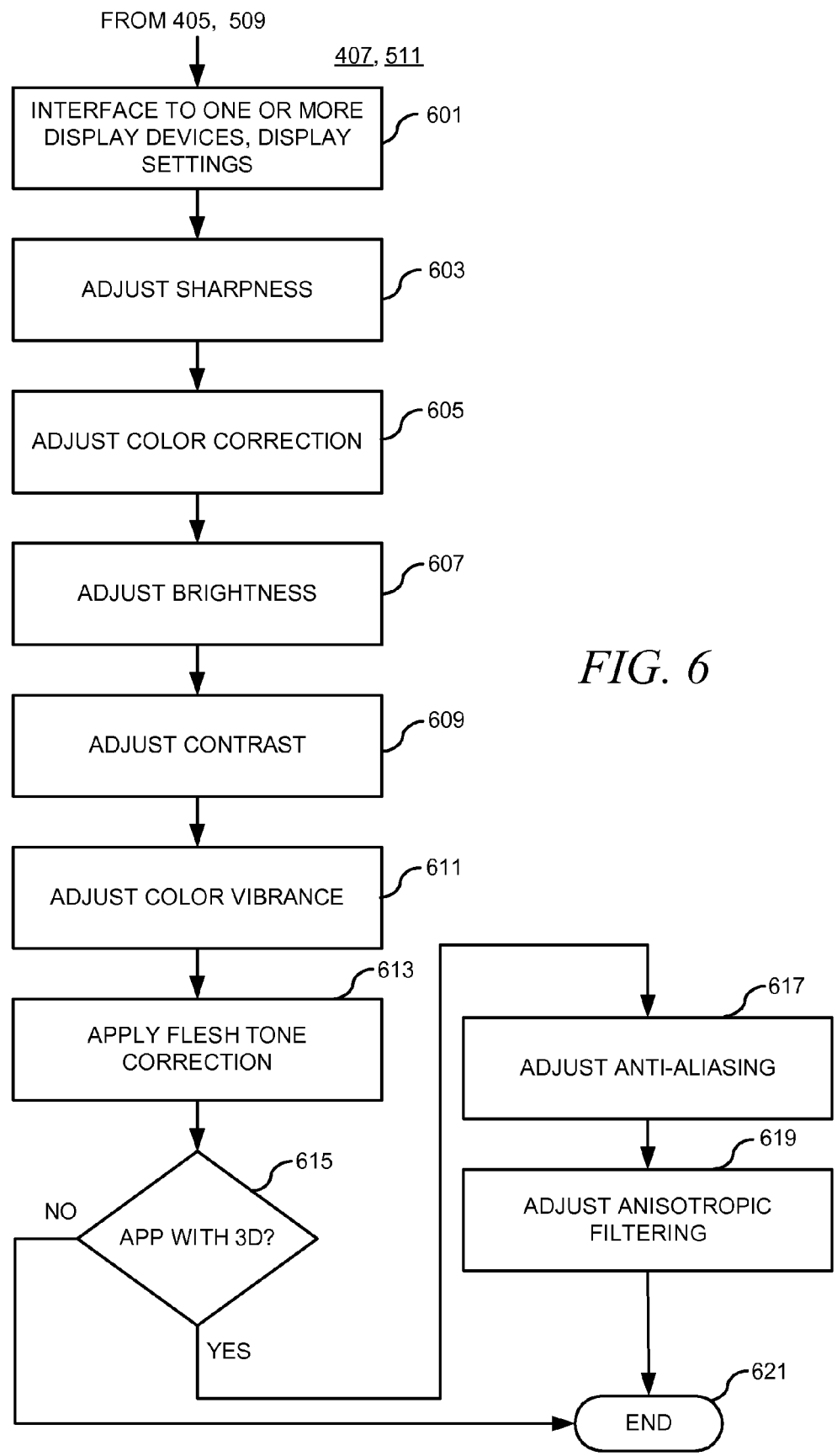
FIG. 6 is a flow chart showing further details of operation for handling image quality settings in accordance with an embodiment.

The flowchart of FIG. 6 provides further details of the settings adjustment that are made as shown in block 407 of FIG. 4 and block 511 of FIG. 5. As shown in FIG. 6, 601, the dynamic image quality configuration logic 300 will operatively interface with the display settings of one or more display devices. The remaining blocks of FIG. 6 show the parameters that may be adjusted based on the given profile. That is, various image quality settings may be adjusted including; sharpness in 603, color correction in 605, brightness in 607, contrast in 609, color vibrance in 611, and flesh tone correction in 613. Additionally, or alternatively, in an application using 3D images is in use (that is, accessed and having an application display window in focus) as determined in 615, then anti-aliasing may be adjusted as shown in 617. Further, anisotropic filtering may also be adjusted as shown in 619. The adjustment process then ends, after all the settings of the profile have been applied, as shown in 621.

Therefore an intelligent image quality adjustment system and methods of operation have been disclosed herein wherein any other variations that would be equivalent to the herein disclosed embodiments and that may occur to those of ordinary skill in the art and would remain in accordance with the scope of embodiments as defined herein by the following claims. That is, the embodiments are not limited to the particular details of the apparatus and methods depicted and other modifications and applications may be contemplated. Further changes may be made in the above-described method and device without departing from the true scope of the embodiments herein involved. It is intended, therefore, that the subject matter in the above depiction should be interpreted as illustrative, not in a limiting sense.

What is claimed is:

1. A method comprising:
    displaying a plurality of application windows;
    detecting an application access of one application window of the plurality of application windows;
    configuring, in response to detecting said application access, automatically without user intervention, the display system in an image quality configuration for said detected application wherein said image quality configuration is based on providing best image quality with respect to said application; and
    prioritizing which application of the plurality of applications receives priority of image quality configuration.

2. The method of claim 1, wherein configuring said display system in an image quality configuration, comprises:
    determining that a profile associated with said application or associated with a file type is stored in memory; and
    configuring said display system according to said profile.

3. The method of claim 1, wherein configuring said display system in an image quality configuration, comprises:
    adjusting at least one anti-aliasing parameter or at least one anisotropic filter parameter.

4. The method of claim 1, wherein configuring said display system in said image quality configuration comprises:
    adjusting at least one setting selected from the settings of: sharpness, color correction, brightness, contrast, color vibrance and flesh tone correction.

5. An apparatus comprising:
    image quality configuration logic operative to:
    configure, in response to detecting an application access, automatically without user intervention, a display system in an image quality configuration for said detected application wherein said image quality configuration is based on providing best image quality with respect to said application; and prioritize which application of a plurality of applications receives priority of image quality configurations.

6. The apparatus of claim 5, wherein said logic is operative to:

determine that a profile associated with an application or associated with a file type is stored in memory; and configure said display system according to said profile.

7. The apparatus of claim 5, wherein said logic is operative to:

adjust at least one anti-aliasing parameter or at least one anisotropic filter parameter.

8. The apparatus of claim 5, wherein said logic is operative to:

monitor an operating system of said display system and obtain an indication from said operating system that an application has been accessed or that a file type has been accessed.

9. The apparatus of claim 5, wherein said logic is operative to:

monitor a GPU of said display system and obtain a process invocation indication from said GPU wherein said process invocation corresponds to a specific application access.

10. The apparatus of claim 5, wherein said logic is operative to:

display, on a display screen space, of said display system, a plurality of application windows wherein said application access is a selection of one application window of said plurality of application windows;

determine that said one application window is larger than a minimum percentage of said display screen space; and configure said display system in said image quality configuration for said application wherein said application provides a display only within said one application window.

11. The apparatus of claim 5, wherein said logic is operative to:

display, on a display screen space, of said display system, a plurality of application windows wherein said application access is a selection of one application window of said plurality of application windows;

determine that processor utilization of at least one processor, related to an application corresponding to said one application window, is larger than a minimum percentage processor utilization; and configure said display system in said image quality configuration for said application wherein said application provides a display only within said one application window.

12. The apparatus of claim 5, wherein said logic is operative to:

adjust at least one setting selected from the settings of: sharpness, color correction, brightness, contrast, color vibrance and flesh tone correction.

* * * * *